(12) United States Patent  
Soares (10) Patent No.: US 6,501,060 B1
(45) Date of Patent: Dec. 31, 2002

(54) CORRECTING DISTORTIONS IN OPTICAL SIGNALS

(75) Inventor: Schubert Soares, Canon Country, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/181,076

(22) Filed: Oct. 27, 1998

(51) Int. Cl.[7] ................................................. G01J 1/20
(52) U.S. Cl. ..................................... 250/201.1; 250/206
(58) Field of Search .......................... 250/201.1, 201.2, 250/201.4, 234, 235, 206, 206.1; 356/4.04, 153; 359/554–557, 345

(56) References Cited

U.S. PATENT DOCUMENTS

| | | | |
|---|---|---|---|
| 4,701,602 A | * 10/1987 | Schaefer et al. | 356/139.08 |
| 4,801,791 A | * 1/1989 | Cain | 250/201.1 |
| 4,987,461 A | * 1/1991 | Brueck et al. | 257/80 |
| 5,162,641 A | * 11/1992 | Fountain | 250/201.2 |
| 5,880,455 A | * 3/1999 | Otaki et al. | 250/201.8 |
| 5,923,418 A | * 7/1999 | Clark et al. | 356/153 |
| 5,969,851 A | * 10/1999 | Clark et al. | 359/345 |

OTHER PUBLICATIONS

S.D. O'Connor and S.F. Soares; Picometre displacement tracking of an optical beam in a silicon Schottky barrier sensor; Aug., 22, 1994, Electronics Letters Online No. 19941246.

* cited by examiner

Primary Examiner—Frank G. Font
Assistant Examiner—Thanh X. Luu
(74) Attorney, Agent, or Firm—Fish & Richardson P.C.

(57) ABSTRACT

An apparatus for use in automatically correcting distortion in an optical signal includes an optical relay element positioned to receive the optical signal from a remote source and to relay the optical signal; and a photosensor positioned to receive a portion of the optical signal from the optical relay element, and configured to produce an electronic signal that varies with the distortion in the optical signal. Processing circuitry is configured to receive the electronic signal from the photosensor to detect variations in the electronic signal caused by the distortion in the optical signal, and to generate a control signal in response to the variations. An adjustment element is configured to receive the control signal from the processing circuitry and, in response to the control signal, to correct the distortion in the optical signal.

38 Claims, 9 Drawing Sheets

CORRECTING DISTORTIONS IN OPTICAL SIGNALS

BACKGROUND OF THE INVENTION

The invention relates to correcting distortions in optical signals.

In many optical systems, including both optical data systems and optical imaging systems, beam stabilization and beam focus are critical for error-free data transmission or ideal image quality. Beam focus is particularly problematic when optical signals must be transmitted over long ranges, e.g., several miles, which are common in geographical imaging and interplanetary communication applications. Likewise, beam stabilization is difficult to achieve when atmospheric or mechanical jitter exists in the optical data or imaging system. Jitter can result both from movement of the signal source and movement of the signal reception system. For example, human movement is a common source of mechanical jitter in a video recording system, such as a handheld camcorder.

Figure 1:
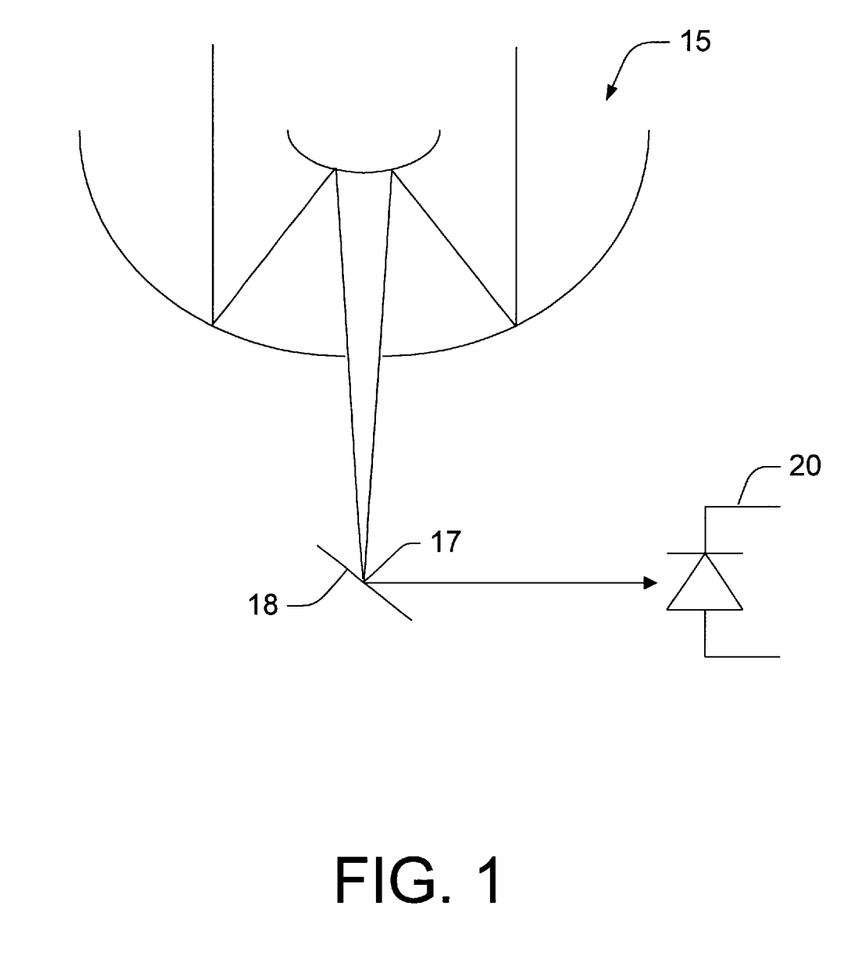
FIG. 1 is a schematic diagram of a conventional optical signal acquisition system.

FIG. 1 shows a common optical signal reception system 15, such as a telescope for use in interplanetary communications. The reception system 15 includes one or more curved mirrors 16a, 16b, which together focus an incoming optical signal at a focal point 17. Another mirror 18 is positioned at the focal point 17 to reflect the focused optical signal onto an optical sensor, such as a photodiode 20, in a receiver. In general, conventional reception systems such as this one preserve and even introduce distortions in the optical signals that result from jitter and lack of focus.

SUMMARY OF THE INVENTION

Recognition of the above led the inventor to develop an optical signal acquisition system capable of compensating for spatial vibrations in optical signals and automatically focusing the telescope or lens system from which the optical signal is received.

In one aspect, the invention relates to automatically correcting distortion, such as a spatial vibration or a lack of focus, in an optical signal, such as an optical data signal. An optical relay element receives the optical signal from a remote source and directs the optical signal toward a specified target. A photosensor receives a portion of the optical signal and produces an electronic signal that varies with the distortion in the optical signal. Processing circuitry receives the electronic signal from the photosensor, detects variations in the electronic signal caused by the distortion in the optical signal, and generates a control signal in response to the variations. An adjustment mechanism receives the control signal from the processing circuitry and, in response to the control signal, corrects the distortion in the optical signal.

In some embodiments, the adjustment element is coupled to the optical relay element, and in other embodiments it is coupled to the target. Also, a beam splitter may be positioned before the optical relay element to reflect a portion of the optical signal toward the photosensor. An optical delay element may be positioned before the beam splitter and the optical relay element. A second photosensor may be used to receive a portion of the corrected optical signal and to produce a feedback signal that varies with any distortion that remains in the corrected optical signal. The processing circuitry may be used to receive the feedback signal from the second photosensor, to detect variations in the feedback signal caused by the distortion that remains in the corrected optical signal, and to alter the control signal in response to the detected variations.

In other embodiments, a beam splitter may be positioned after the optical relay element to reflect a portion of the corrected optical signal toward the second photosensor. The optical relay element may be a reflective device, such as a mirror. The adjustment element may be used to adjust the position of the reflective device in response to the control signal. The photosensor may include two pairs of position-sensing, Schottky-barrier photodiodes.

In another aspect, the invention relates to automatically compensating for spatial vibration of an optical signal. An optical relay element receives the optical signal from a remote source and directs the optical signal toward a specified target. A photosensor receives a portion of the optical signal and produces an electronic signal that varies as the optical signal moves across the photosensor as a result of the spatial vibration. Processing circuitry receives the electronic signal from the photosensor, processes the electronic signal to determine the extent of the spatial vibration, and generates a control signal in response to the spatial vibration. An adjustment mechanism coupled to the optical relay element receives the control signal from the processing circuitry and, in response to the control signal, adjusts the optical relay element to compensate for the spatial vibration in the optical signal.

In yet another aspect, the invention relates to automatically focusing an optical signal. An optical relay element receives the optical signal from a remote source and focuses the optical signal on a specified target. A photosensor receives a portion of the optical signal and produces an electronic signal that varies with changes in the focus of the optical signal. Processing circuitry receives the electronic signal from the photosensor, processes the electronic signal to determine whether the focus of the optical signal can be improved, and generates a control signal if the focus can be improved. An adjustment mechanism coupled to the optical relay element receives the control signal from the processing circuitry and, in response to the control signal, adjusts the optical relay element to improve the focus of the optical signal.

The invention is useful in a wide variety of applications, including interplanetary communications and video recording systems. For example, optical signals from a space probe several million miles from Earth can be stabilized and focused with nanometer precision, e.g., to a beam size of 0.005 mm$^2$ at the detector, which allows data communication rates of 1 Gbit/sec or greater. Likewise, optical signals in an optical recording system or an optical microscope can be focused and stabilized automatically with nanometer precision. All of this may be accomplished with a simple, passive detection device that requires no applied bias or power source, and therefore that introduces virtually no noise to the signal acquisition environment.

Other embodiments and advantages will become apparent from the following description and from the claims.

DETAILED DESCRIPTION

Figure 2:
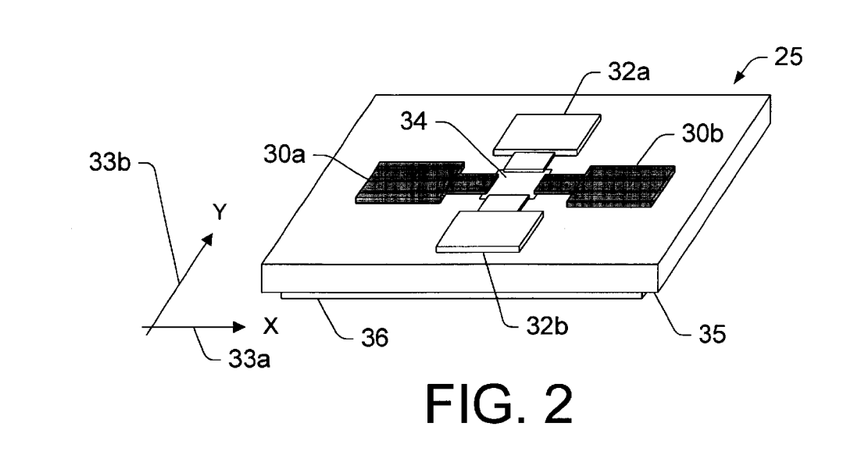
FIG. 2 is a perspective view of a photosensor for use in an improved optical signal acquisition system.

FIG. 2 shows a photosensor 25 that is suited for use in an optical signal acquisition system embodying the invention. The photosensor 25 is a high-resolution, displacement-type or position-type photosensor having two pairs of Schottky-barrier contacts 30a–b, 32a–b comprising Schottky photodiodes. The contacts 30a–b, 32a–b in each pair enclose a two-dimensional photosensitive area exposing the photosensor's semiconductor surface 34. The exposed portion of the semiconductor surface has dimensions of approximately 1×1 mm$^2$, and perhaps as great as 10×10 mm$^2$. As the optical signal impinges upon the semiconductor surface 34, the contact pairs 30a–b, 32a–b produce two short-circuit current or open-circuit voltage signals, I(x) and I(y), the amplitudes of which indicate the relative position of the optical signal between the contacts in the pair. Therefore, each contact pair 30a–b, 32a–b indicates the position of the light beam in one of two orthogonal dimensions, defined by an x-axis 33a and a y-axis 33b.

The photosensor 25 also may include a conductive backplane 36 on its rear surface 35. The conductive backplane 36 may be formed from a conductive material, e.g., a conductive metal such as gold or silver, coated onto the rear surface 35 of the photosensor 35. As the optical signal strikes the semiconductor surface 34 of the photosensor 25, electric potential forms between each of the Schottky-barrier contacts 30a–b, 32a–b and the conductive backplane 36. The total potential between the four contacts and the backplane can be measured, either as an open-circuit voltage or a short-circuit current, and used to normalize the output signals I(x) and I(y) produced by the photosensor.

Figure 3A:
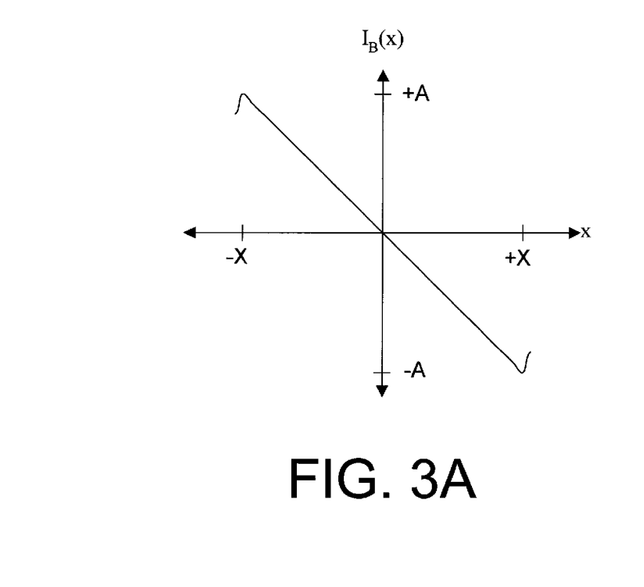
FIGS. 3A and 3B are graphs illustrating output from the photosensor versus position of the optical signal on the semiconductor surface of the photosensor.

FIG. 3A shows the relationship between the amplitude of the signal I(x) and the position at which the optical signal strikes the semiconductor surface of the photosensor. The signal I(x) varies approximately linearly with the position x of the optical signal between the contacts in the pair 30a, 30b lying along the x-axis 33a. At x=−X, the signal I(x) has a value of approximately +A; at x=+X, the signal has a value of approximately −A; and between the two ends, at x=0, the signal has a value of approximately zero.

Figure 3B:
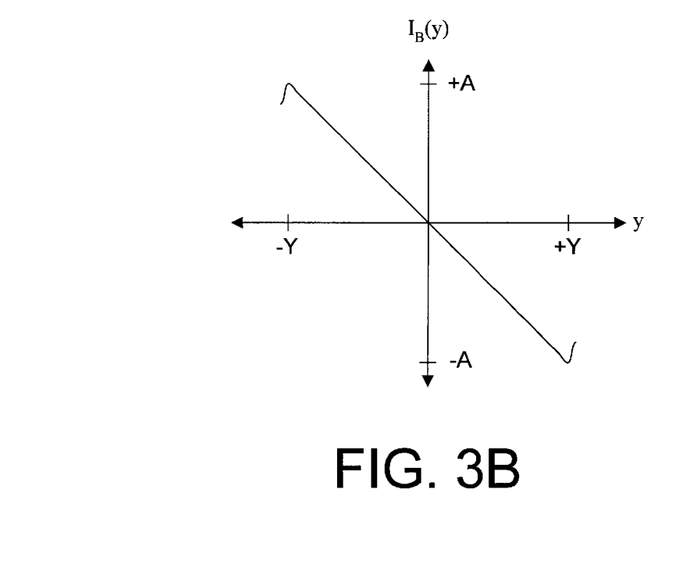

Likewise, FIG. 3B shows that the signal I(y) varies approximately linearly with the position y of the optical signal between the contacts in the pair 32a, 32b lying along the y-axis 33b. At y=−Y, the signal I(y) has a value of approximately +A; at y=+Y, the signal has a value of approximately −A; and between the two ends, at y=0, the signal has a value of approximately zero.

The following U.S. patent and publications, all of which are incorporated by reference, describe the structure, fabrication, and operation of suitable photosensors: (1) U.S. Pat. No. 4,987,461, issued Jan. 22, 1991; (2) S. D. O'Connor & S. F. Soares, "Picometer displacement tracking of an optical beam in a silicon Schottky barrier sensor," Electronics Letters, Vol. 30, No. 22, Oct. 27, 1994; (3) K. A. M. Scott et al., "A High resolution Si position sensor," Applied Physics Letters, Vol. 62, No. 24, Jun. 14, 1993; (4) S. F. Soares, "Photoconductive Gain in a Schottky Barrier Photodiode," Japanese Journal of Applied Physics, Vol. 31, Part 1, No. 2A, February 1992; and (5) B. W. Mullins et al., "A Simple High-Speed Si Schottky Photodiode," IEEE Photonics Technology Letters, Vol. 4, No. 4, April 1991. The sensors described in these publications are relatively simple and inexpensive to manufacture, costing as little as pennies per unit. The semiconductor surface 34 of the photosensor may be coated with a transmitting "passivation" layer, e.g., a layer of oxide or nitride film, to protect the surface from damage that might otherwise occur from repetitive use.

Figure 4:
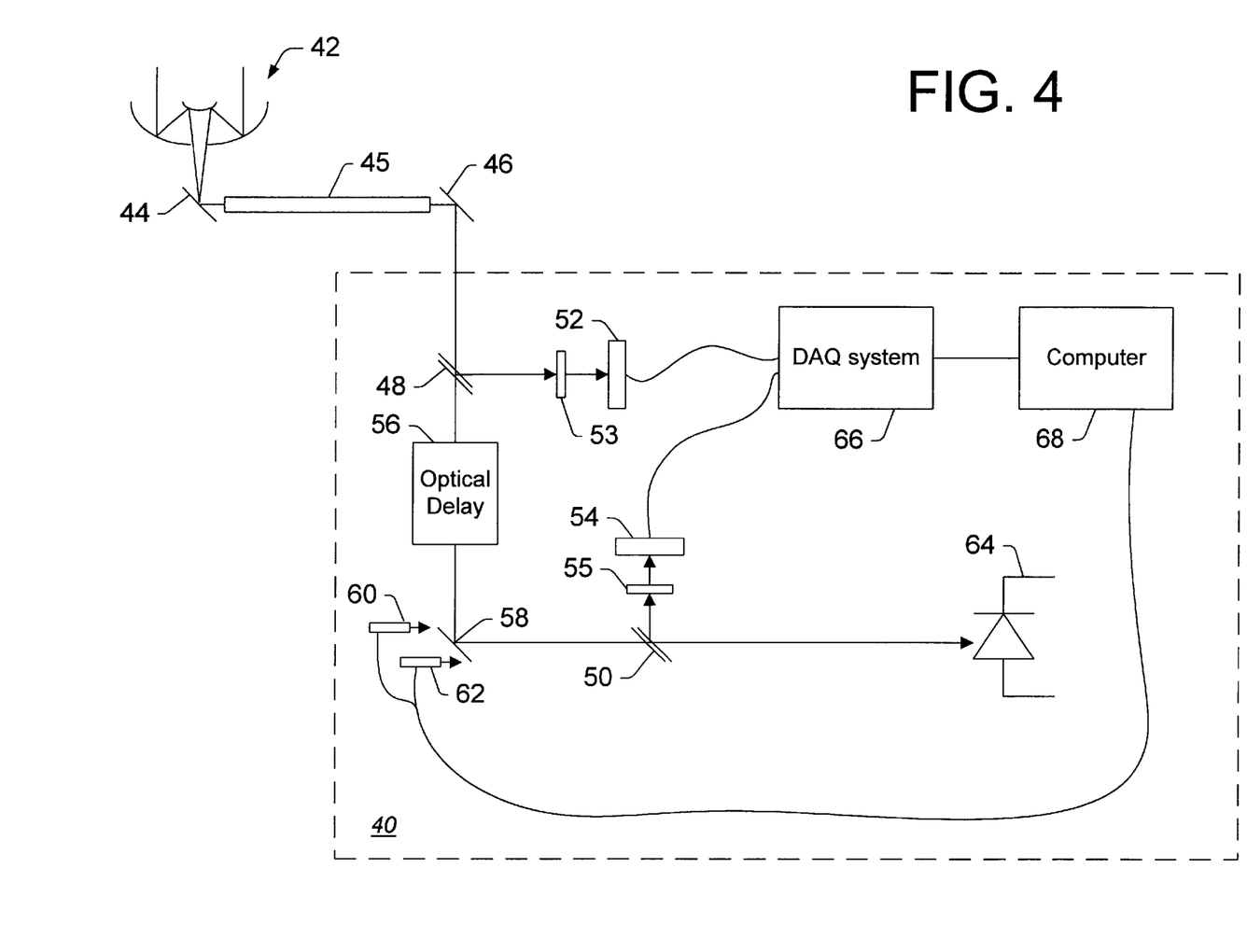
FIG. 4 is a schematic diagram of an optical signal acquisition system capable of compensating for spatial vibrations in a received optical signal.

FIG. 4 shows an optical signal acquisition system 40 that compensates for spatial variations in received optical signals. A telescope 42, e.g., the earth-bound telescope discussed above, focuses the optical signal to a predetermined diameter, e.g., approximately one wavelength. An optical conductor 45, such as a fiber optical cable, and one or more mirrors 44, 46 may be positioned as needed to direct the optical signal from the telescope to the signal acquisition system 40.

The signal acquisition system 40 includes two beam splitters 48, 50 that redirect some of the light in the optical signal toward two two-dimensional, high-resolution photosensors 52, 54, which are of the type shown in FIG. 2. Each of the photosensors may be packaged, e.g., on a critically damped accelerometer. Image intensifier crystals 53, 55 may be positioned between the beam splitters 48, 50 and the photosensors 52, 54 to intensify the optical image before it reaches the photosensors.

An optical delay element 56 and an adjustable mirror 58 are positioned between the beam splitters 48, 50. The optical delay element 56 compensates for electronic signal processing times. One or more adjustment elements, e.g., piezoceramic actuators 60, 62, are coupled to the mirror 58 to adjust the mirror's position in response to spatial vibrations in the optical signal. Signal processing circuitry, e.g., a digital acquisition (DAQ) system 66 and a digital computer 68, detects the spatial vibrations in the optical signal and controls the piezoceramic actuators 60, 62 to compensate accordingly. Another photosensor, e.g., a standard high-speed photodiode 64, receives the corrected optical signal and delivers it to an appropriate signal processing system for data acquisition.

In operation, the optical signal enters the signal acquisition system 40 and encounters the first beam splitter 48, which directs a portion, typically between 1% and 5%, of the signal toward the first 2-D photosensor 52. The first image intensifier crystal 53 amplifies the intensity of this portion of the optical signal, by producing many, e.g., ten photons for each photon that strikes the crystal 53. The intensified optical signal then strikes the semiconductor surface of the first photosensor 52.

As discussed above, the photosensor 52 produces two short-circuit current or open-circuit voltage signals, the magnitudes of which indicate the position of the optical signal on the semiconductor surface of the photosensor 52. The DAQ system 66, which may include a very low-noise, high-gain amplifier coupled with either an analog-to-digital (A/D) converter or a sensitive voltmeter, receives the signals from the photosensor 52, amplifies and digitally samples the signals, and then provides the digital samples to the computer 68. The computer 68 executes a program, as described below, to detect the motion of the optical signal across the semiconductor surface of the photosensor 52 and to generate control signals governing the operation of the piezoceramic actuators 60, 62.

After passing through the first beam splitter 48, the optical signal encounters the optical delay element 56, which delays the optical signal by a predetermined amount, e.g., 1 µs, while the signal processing circuitry performs its calculations. The computer 68 attempts to meter delivery of the control signals to the piezoceramic actuators 60, 62 so that the actuators adjust the position of the mirror 58 very precisely to compensate for the motion of the optical signal.

The second beam splitter 50 directs a portion of the corrected optical signal through the second image intensifier crystal 55 and onto the second 2-D photosensor 54. Like the first photosensor 52, the second photosensor 54 produces two short-circuit current or open-circuit voltage signals indicating the position of the optical signal on the photosensor's semiconductor surface. These signals provide feedback indicating how precisely the computer's control algorithm is tracking the spatial vibrations in the optical signal. The computer 68 uses the signals from the second photosensor 54 to adjust the piezoceramic control signals accordingly. The second beam splitter 50 and the second 2-D photosensor 54 may be eliminated from the signal acquisition system if beam-correction feedback is not needed.

Figure 5:
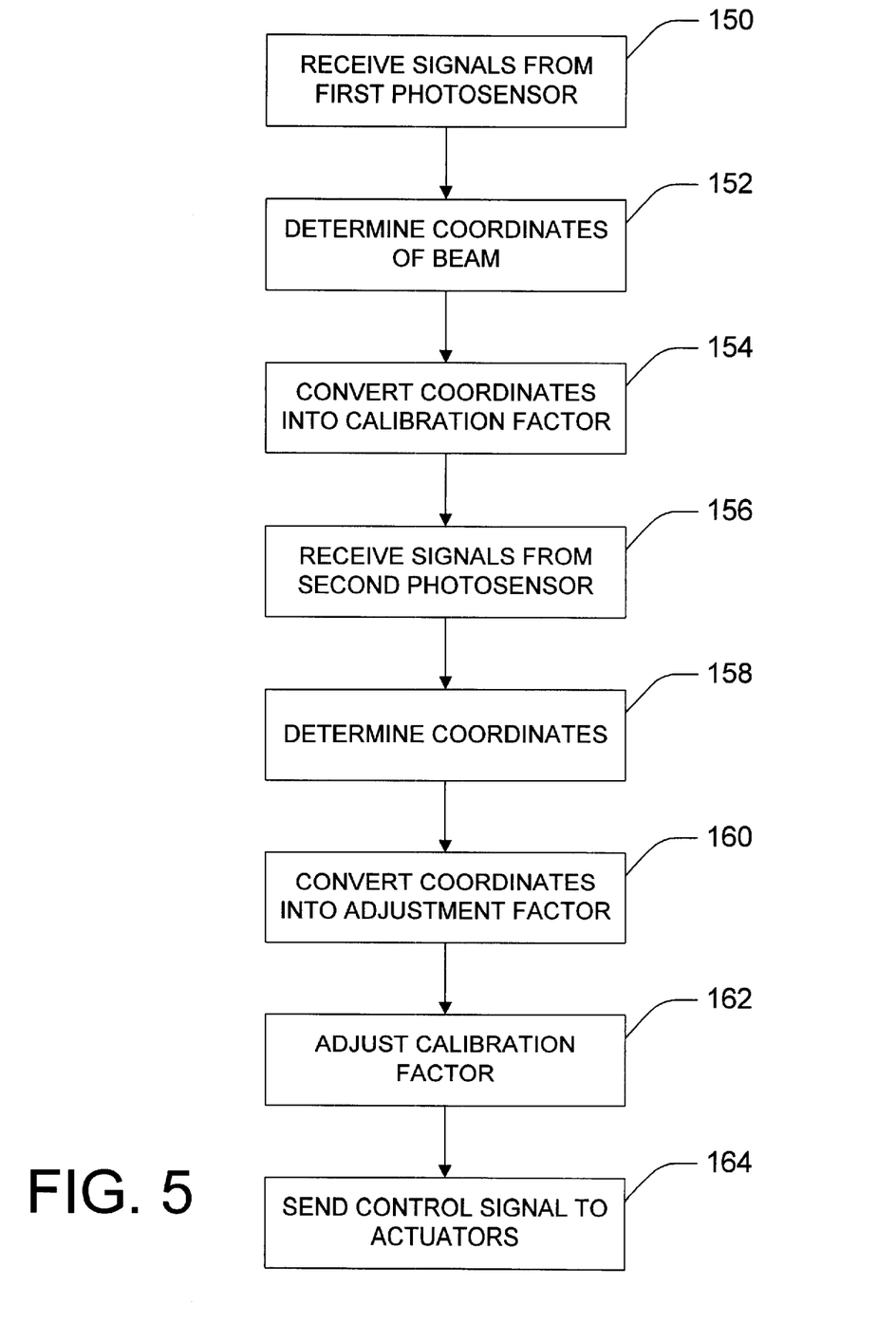
FIG. 5 is a flow chart for the operation of a computer in the optical signal acquisition system of FIG. 4.

FIG. 5 is a flow chart for operation of the computer's vibration-tracking program. The computer first measures the magnitudes of the output signals from the first photosensor (step 150) and uses the measured amplitudes to determine the location, in Cartesian coordinates, of the optical signal on the photosensor's semiconductor surface (step 152). The computer uses the coordinates to determine a calibration factor for the adjustable mirror (step 154). The computer then measures the magnitudes of the output signals from the second photosensor (step 156), determines the coordinates of the optical signal on the second photosensor (step 158), and uses these coordinates to determine a calibration adjustment factor (step 160). The computer uses the calibration adjustment factor to adjust the calibration factor in response to over-compensation or under-compensation of the mirror (step 162). The computer then generates a control signal based on the adjusted calibration factor and delivers the control signal to the piezoceramic actuators (step 164), which, in response, adjust the position of the mirror.

Figure 6:
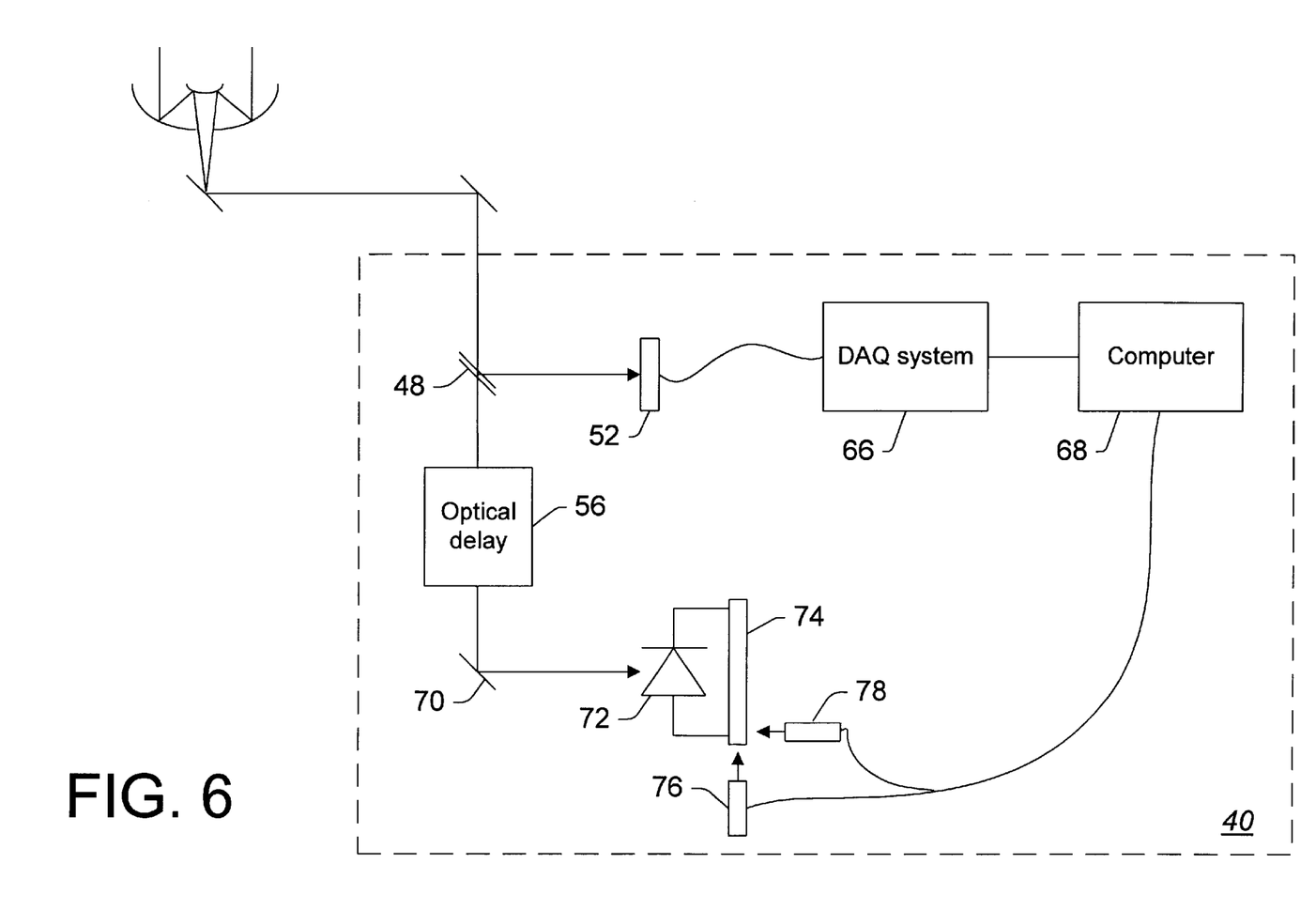
FIG. 6 is a schematic diagram of an alternative optical signal acquisition system capable of compensating for spatial vibrations in a received optical signal.

FIG. 6 shows an alternative configuration for the signal acquisition system 40, which includes a non-adjustable mirror 70 and a standard high-speed photodiode 72 mounted on an adjustable stage 74. As before, the first beam splitter 48 directs a portion of the optical signal toward the first 2-D photosensor 52. The DAQ system 66 and the computer 68 use the signals from the photosensor 52 to generate control signals that govern the operation of one or more adjustment elements, piezoceramic actuators 76, 78, coupled to the adjustable stage 74. The computer 68 attempts to meter its delivery of the control signals so that the actuators 76, 78 adjust the position of the photodiode 72 to track the motion of the optical signal precisely.

Figure 7:
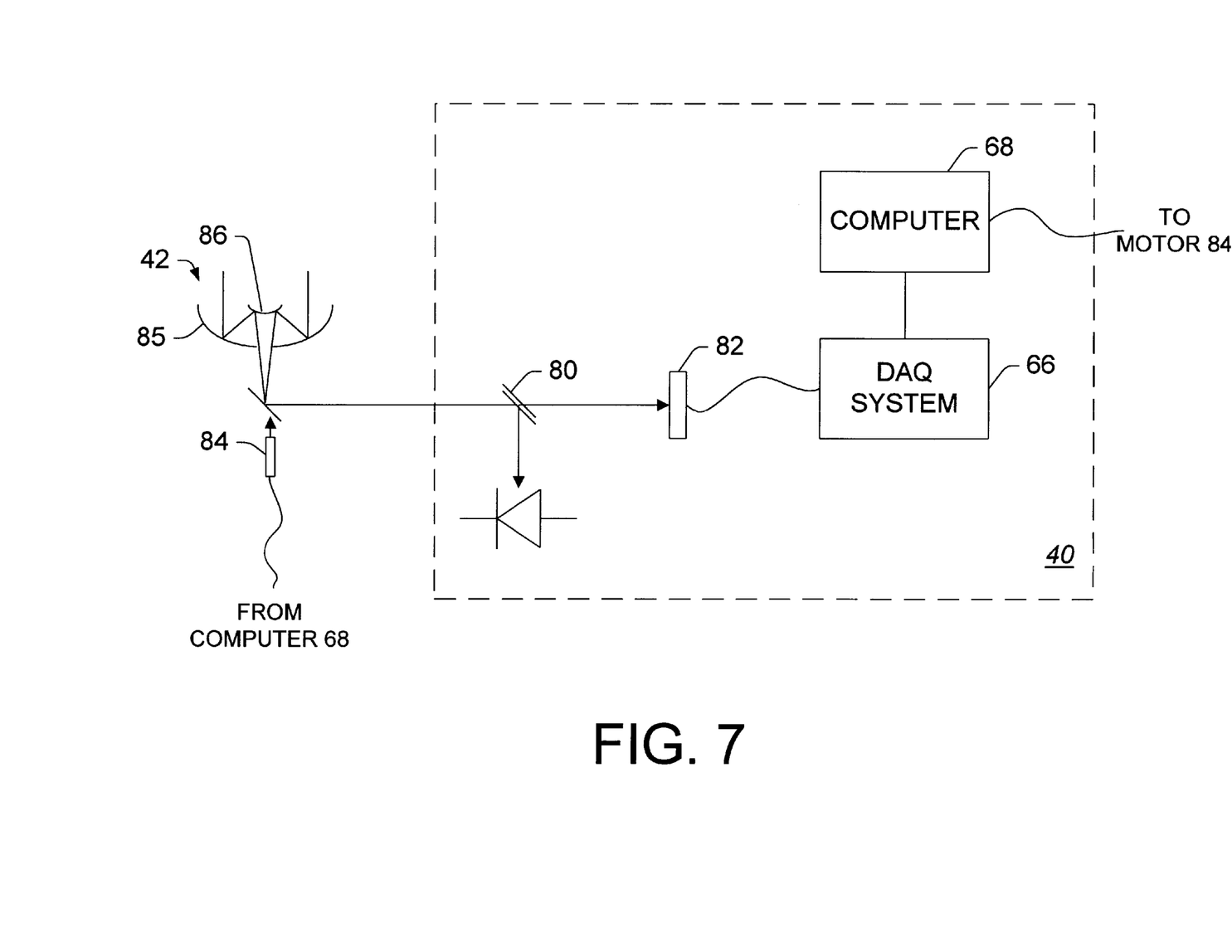
FIG. 7 is a schematic diagram of an optical signal acquisition system capable of automatically focusing the telescope or lens system from which the optical signal is received.

FIG. 7 shows how the optical signal acquisition system 40 and the telescope 42 may be configured for automatic focusing of the telescope 42. In this configuration, a beam splitter 80 directs a portion of the optical signal onto a two-dimensional, high-resolution photosensor 82, of the type shown in FIG. 2. The short-circuit current or open-circuit voltage signals produced by the photosensor 82 indicate the power density of the signal as it strikes the photosensor's semiconductor surface. In particular, the optical signal has maximum power density when it is most tightly focused by the telescope 42. The signals produced by the photosensor 82 are proportional to the power density of the signal, with maximum values at peak power density. As the telescope's focus becomes less sharp, the power density of the optical signal decreases, and the magnitudes of the photosensor's output signals decrease.

The DAQ system 66 receives the signals produced by the photosensor 82, amplifies and digitally samples the signals, and delivers the samples to the computer 68. The computer 68 executes a program, as described below, to determine the power density of the optical signal as it strikes the semiconductor surface of the photosensor 52 and to generate a control signal that will govern the operation of an adjustment element, such as a stepper motor 84, coupled to a mirror 87 nominally positioned at the telescope's focal point 89. The computer 68 focuses the telescope automatically by activating the stepper motor 84, and therefore adjusting the position of the mirror 87, in a manner that gives the optical signal its highest possible power density at the semiconductor surface of the photosensor 82.

Figure 8A:
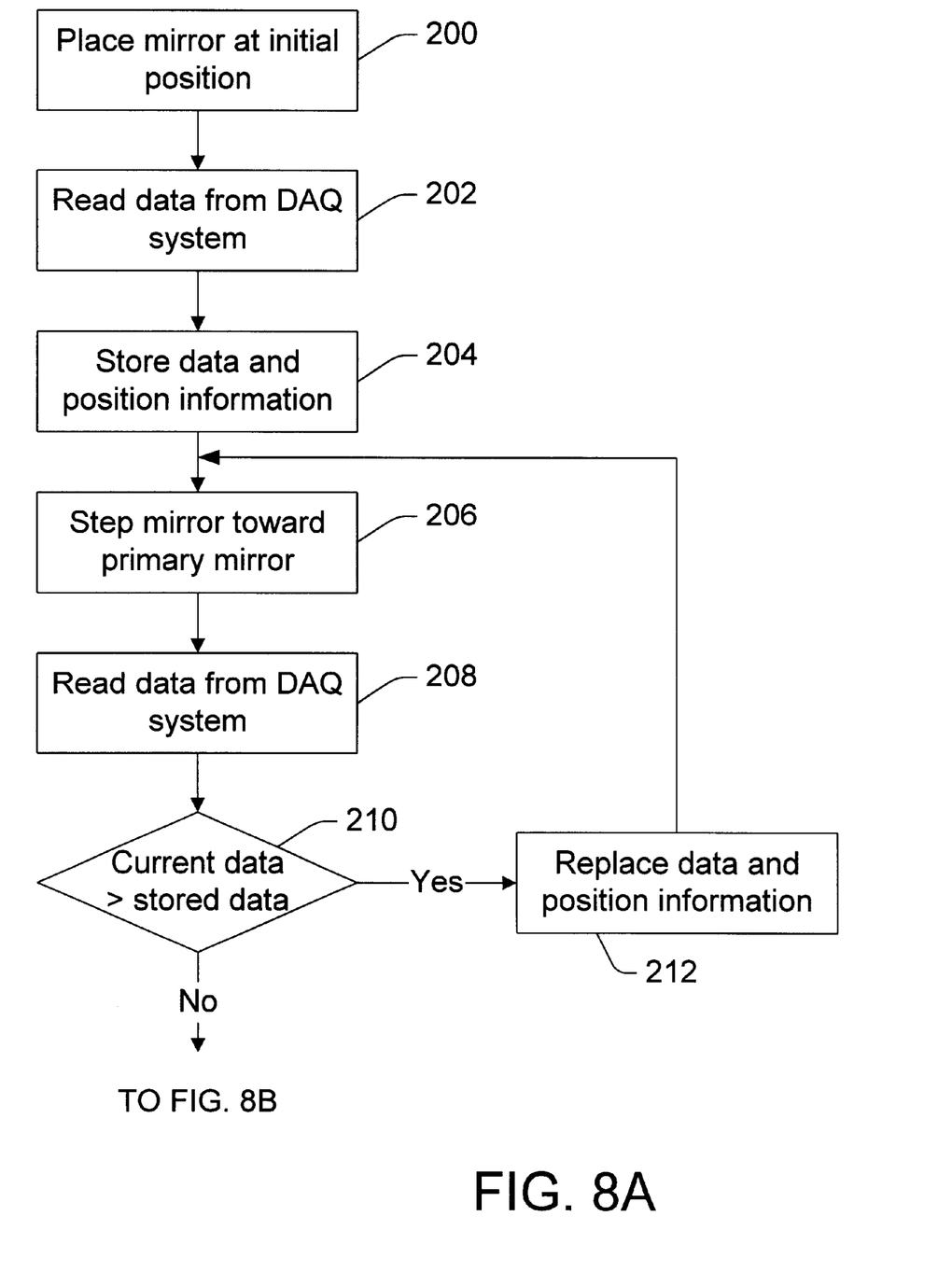
FIGS. 8A and 8B together are a flow chart for the operation of a computer in the optical signal acquisition system of FIG. 7.
Figure 8B:
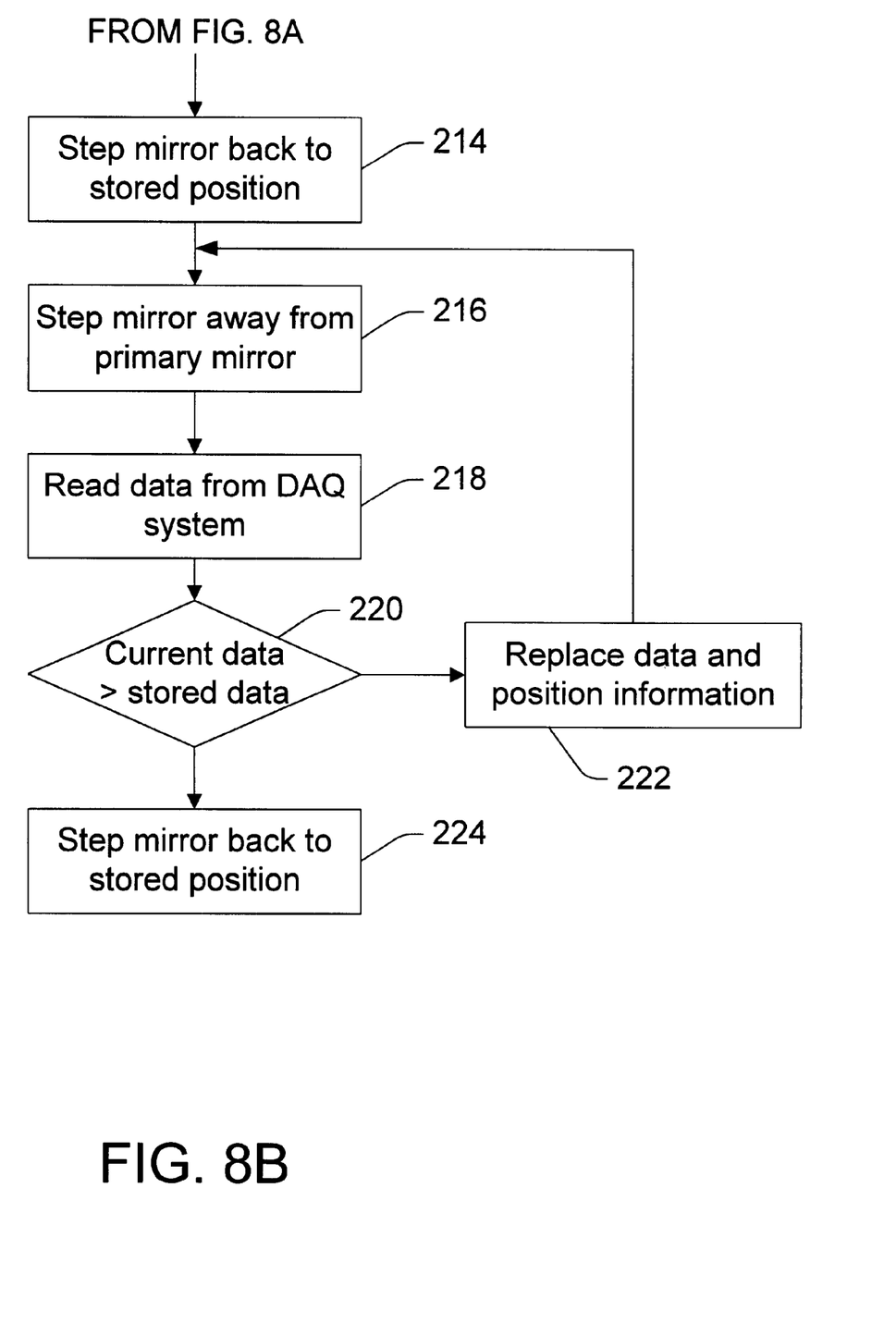

FIGS. 8A and 8B together are a flow chart for operation of the computer's autofocus program. The program begins by generating a control signal that instructs the stepper motor 84 to place the mirror 87 at a predetermined initial position (step 200). The program then reads the digital data provided by the DAQ system (step 202), which indicates the magnitude of the optical signal's power density. The program stores the power density value in a dedicated storage area, e.g., at a predetermined location in a memory device, along with information indicating the present position of the mirror (step 204). The program then generates a control signal instructing the motor to step the mirror toward the primary mirror 85 by a predetermined distance (step 206) and again reads the data provided by the DAQ system (step 208). The program compares the newly read data and the data stored in memory to determine whether the present power density value is greater than the stored value (step 210). If the present value is greater, the program replaces the data stored in memory with the newly read data and with information indicating the present position of the secondary mirror (step 212). The program then again steps the mirror toward the primary mirror (step 206), reads the data provided by the DAQ system (step 208), and determines whether the present power density value is greater than the stored value (step 210). The program continues in this manner until the mirror has stepped to a position that produces a power density value equal to or less than the stored value.

If the program determines that the present power density value is not greater than the stored value, the program steps the mirror back to the position stored in memory (step 214), then steps the mirror away from the primary mirror by the predetermined distance (step 216). The program then reads the power density value provided by the DAQ system (step 218) and determines whether the present value is greater than the value stored in memory (step 220). If so, the program replaces the stored data with the present power density value and with information indicating the present position of the mirror (step 222). The program then again steps the mirror away from the primary mirror (step 216), reads the power density value from the DAQ system (step 218), and determines whether the present value is greater than the stored value (step 220). The program continues in this manner until the mirror has stepped to a position that produces a power density value equal to or less than the stored value. When this happens, the program steps the mirror back to the position stored in memory (step 224), which is treated as the optimal focus position. The computer may execute the autofocus program at predetermined time intervals or upon receiving an instruction from the user to do so.

Figure 9:
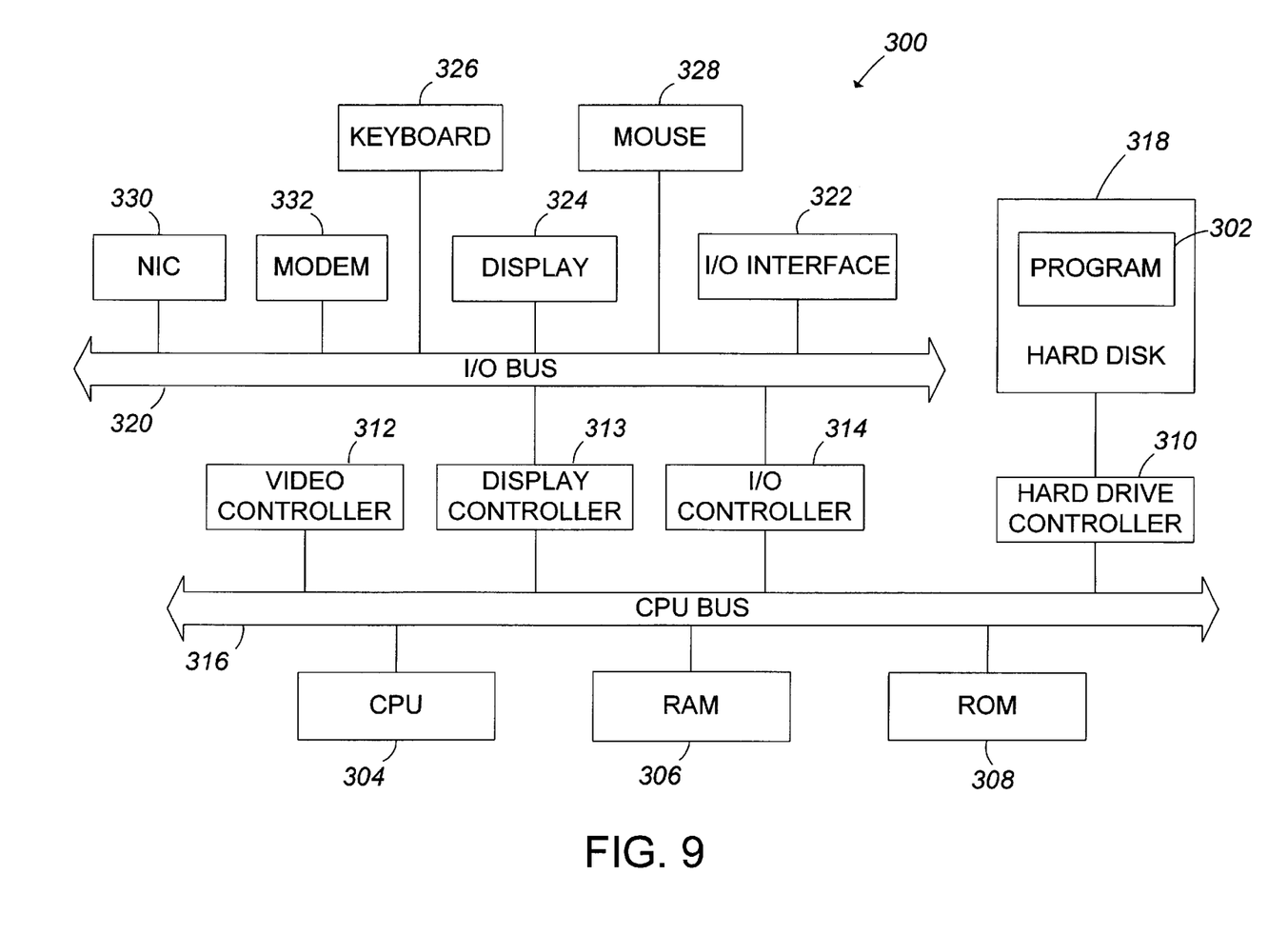
FIG. 9 is a schematic diagram of a computer system that may be used to carry out the invention.

FIG. 9 shows a programmable computer 300 that may be used to carry out the invention. The computer 300 may include, among other things, a processor 304, a random access memory (RAM) 306, a non-volatile memory 308 (e.g., a writable read-only memory such as a flash ROM), a hard drive controller 310, a video controller 312, a display controller 313, and an input/output (I/O) controller 314, all coupled by a processor (CPU) bus 316. The computer 300 may be preprogrammed, e.g., in ROM, or it may be programmed by loading an executable program 302 from another source, such as a hard disk 318, a floppy disk, a CD-ROM or another computer.

The hard drive controller 310 is coupled to the hard disk 318 and is used to deliver information, such as the executable program 302, from the hard disk 318 to the processor bus 316. The I/O controller 314 is coupled by means of an I/O bus 320 to an I/O interface 322. The I/O interface 322 receives and transmits data in analog or digital form over communication links such as a serial link, local area network, wireless link, or parallel link. Also typically coupled to the I/O bus 320 are a display 324, a keyboard 326, a pointing device such as a mouse 328, a network interface card (NIC) 330, and a modem 332 for connecting the computer 300 to another computer or to a computer network, e.g., to an Internet service provider (ISP) or an on-line service provider (OSP). Alternatively, separate connections (i.e., separate buses) may be used for some of the components connected to the I/O bus 320, including the I/O interface 322, the display 324 and the keyboard 326.

While the optical image acquisition and optical recording systems above have been described to include a programmable computer, the signal processing circuitry may be implemented in many ways, including in digital electronic circuitry or in computer hardware, firmware, software, or in combinations of them. Apparatus embodying the invention may be implemented, in part, in a computer program product tangibly embodied in a machine-readable storage device for execution by a computer processor; and methods embodying the invention may be performed by a computer processor executing instructions organized, e.g., into program modules to carry out the invention by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the following claims. For example, the vibration-correction and autofocus techniques described above may be implemented in other types of optical signal processing systems, including video cameras, optical microscopes, binoculars, telescopes, and night vision systems.

What is claimed is:

1. An apparatus for use in automatically correcting distortion in an optical signal, the apparatus comprising:
   a beam splitter positioned to receive the optical signal from a source external to said apparatus and to direct portions of the optical signal in different directions;
   an optical relay element positioned to receive a portion of the optical signal from said beam splitter and to relay the optical signal;
   an optical delay element positioned between the beam splitter and the optical relay element to delay the optical signal by a predetermined delay time period;
   a photosensor positioned to receive another portion of the optical signal from the beam splitter, and configured to use the received other portion to produce an electronic signal that varies with the distortion in the optical signal;
   processing circuitry configured to receive the electronic signal from the photosensor, to detect variations in the electronic signal caused by the distortion in the received optical signal, and to generate a control signal in response to the detected variations; and
   an adjustment element configured to receive the control signal from the processing circuitry before the predetermined delay time period expires and, in response to the control signal, to correct the distortion in the optical signal relayed by the optical relay element.

2. The apparatus of claim 1, wherein the adjustment element is coupled to the optical relay element.

3. The apparatus of claim 1, wherein the adjustment element is coupled to the photosensor.

4. The apparatus of claim 1, wherein the distortion comprises a spatial vibration of the optical signal.

5. The apparatus of claim 1, further comprising a second photosensor positioned to receive a portion of the optical signal corrected by said adjustment element, and to produce a feedback signal that varies with any distortion that remains in the optical signal.

6. The apparatus of claim 5, wherein the processing circuitry is configured to receive the feedback signal from the second photosensor, to detect variations in the feedback signal caused by the distortion that remains in the corrected optical signal, and to alter the control signal in response to the detected variations.

7. The apparatus of claim 5, further comprising a beam splitter positioned after the optical relay element to reflect a portion of the corrected optical signal toward the second photosensor.

8. The apparatus of claim 1, wherein the optical relay element comprises a reflective device.

9. The apparatus of claim 8, wherein the reflective device comprises a mirror.

10. The apparatus of claim 8, wherein the adjustment element is configured to adjust the position of the reflective device in response to the control signal.

11. The apparatus of claim 1, wherein the optical signal carries digital data.

12. The apparatus of claim 1, wherein the photosensor includes two pairs of Schottky-barrier contacts comprising Schottky photodiodes, each of said two pairs of contacts forming one of two orthogonal axes to detect position of the optical signal.

13. An apparatus for use in automatically compensating for spatial vibration of an optical signal, the apparatus comprising:
   a beam splitter positioned to receive the optical signal from a source external to said apparatus and to direct portions of the optical signal in different directions;

an optical relay element positioned to receive a portion of the optical signal from said beam splitter and to relay the optical signal;

an optical delay element positioned between the beam splitter and the optical relay element to delay the optical signal by a predetermined delay time period;

a photosensor positioned to receive another portion of the optical signal from the beam splitter, and configured to use the received other portion to produce an electronic signal that varies as the optical signal moves across the photosensor as a result of the spatial vibration;

processing circuitry configured to receive the electronic signal from the photosensor, to process the received electronic signal to determine an extent of the spatial vibration, and to generate a control signal in response to the determined extent of spatial vibration; and an adjustment element configured to receive the control signal from the processing circuitry before the predetermined delay time period expires and, in response to the control signal, to compensate for the spatial vibration in the optical signal relayed by the optical relay.

14. The apparatus of claim 13, wherein the adjustment element is coupled to the optical relay element.

15. The apparatus of claim 14, wherein the adjustment element is coupled to the photosensor.

16. The apparatus of claim 13, wherein the electronic signal produced by the photosensor indicates a position at which the optical signal strikes the photosensor.

17. The apparatus of claim 13, further comprising a second photosensor positioned to receive a portion of vibration-compensated optical signal and to produce a feedback signal that varies as the optical signal moves across the second photosensor as a result of any spatial vibration that remains in the vibration-compensated optical signal.

18. The apparatus of claim 13, wherein the processing circuitry is configured to receive the feedback signal from the second photosensor, to process the feedback signal to determine the extent of the remaining spatial vibration, and to alter the control signal in response to the remaining spatial vibration.

19. The apparatus of claim 17, further comprising a beam splitter positioned after the optical relay element to reflect a portion of the vibration-compensated optical signal toward the second photosensor.

20. The apparatus of claim 13, wherein the optical relay element comprises a reflective device.

21. The apparatus of claim 20, wherein the reflective device comprises a mirror.

22. The apparatus of claim 20, wherein the adjustment element is configured to adjust the position of the reflective device in response to the control signal.

23. The apparatus of claim 13, wherein the optical signal carries digital data.

24. The apparatus of claim 13, wherein the photosensor includes two pairs of Schottky-barrier contacts comprising Schottky photodiodes, each of said two pairs of contacts forming one of two orthogonal axes to detect position of the optical signal.

25. A method for use in automatically correcting distortion in an optical signal, the method comprising:

using a beam splitter to receive an optical signal from an external source and to direct a portion of the optical signal toward an optical relay element and another portion of the optical signal toward a photosensor;

using the optical relay element to receive the portion of the optical signal from the beam splitter and to relay the optical signal;

using an optical delay element positioned between the beam splitter and the optical relay element to delay the optical signal by a predetermined delay time period;

receiving from the optical relay element a portion of the optical signal received from the external source;

electronically detecting distortion in the received optical signal by configuring the photosensor to use the portion of the optical signal received from the external source to produce an electronic signal that varies as the optical signal moves across the photosensor as a result of distortion;

generating a control signal in response to the detected distortion before the predetermined delay time period expires; and in response to the control signal, correcting the distortion in the optical signal relayed by the optical relay.

26. The method of claim 25, wherein correcting the distortion includes adjusting the position of the optical relay element in response to the control signal before the predetermined delay time period expires.

27. The method of claim 25, wherein correcting the distortion includes adjusting, in response to the control signal, a position of a target towards which the optical signal is relayed before the predetermined delay time period expires.

28. The method of claim 25, wherein the distortion comprises a spatial vibration of the optical signal.

29. The method of claim 25, further comprising reflecting a portion of the optical signal before it reaches the optical relay element to detect the distortion.

30. The method of claim 25, further comprising electronically detecting any remaining distortion in the optical signal.

31. The method of claim 30, further comprising altering the control signal in response to the detected distortion remaining in the optical signal.

32. The method of claim 30, further comprising reflecting a portion of the optical signal before it reaches a specified target to detect the remaining distortion.

33. The method of claim 25, wherein the optical relay element comprises a reflective device.

34. The method of claim 33, wherein the reflective device comprises a mirror.

35. The method of claim 33, wherein adjusting the optical relay element comprises adjusting the position of the reflective device in response to the control signal.

36. The method of claim 25, wherein the optical signal carries digital data.

37. The method of claim 25, wherein electronically detecting distortion comprises detecting variations in an electronic signal produced by the photosensor that receives the portion of the optical signal.

38. The method of claim 25, wherein electronically detecting distortion in the received optical signal by configuring a photosensor to use the portion of the optical signal received from the external source to produce an electronic signal, comprises using a photosensor including two pairs of Schottky-barrier contacts comprising Schottky photodiodes, each of said two pairs contacts forming one of two orthogonal axes to detect position of the optical signal.

* * * * *